Oct. 23, 1951     A. G. TACKETT     2,572,535

TRAP HOOK

Filed Oct. 9, 1947

Albert G. Tackett
INVENTOR.

UNITED STATES PATENT OFFICE 2,572,535

TRAP HOOK

Albert G. Tackett, Bethel, Ohio

Application October 9, 1947, Serial No. 778,913

5 Claims. (Cl. 43—37)

1

This invention relates to novel and useful improvements in a trap hook.

An object of this invention is to retain the bill portions of a plurality of fish hooks in a closely adjacent position, the said fish hooks sliding and turning into a separated condition, when acted upon by an external force such as the striking of a fish.

A further object of this invention is to retain a plurality of fish hooks on resilient arms, and retain the said resilient arms in a selected position until a fish receives the said hooks in his mouth.

Another purpose of this invention is to release the said hooks when engaged by a fish, whereby the said hooks may spread apart, thereby rendering it substantially impossible for the fish to be lost.

Another purpose of this invention is to provide a pair of cams arranged for carrying out the above mentioned functions.

Another purpose of this invention is to provide an extremely simple and inexpensive device of the character described which lends itself well to commercial manufacture.

Ancillary objects and features of novelty will become apparent to those skilled in the art, in following the description of the preferred form of the invention, illustrated in the accompanying drawings, wherein.

Figure 1:
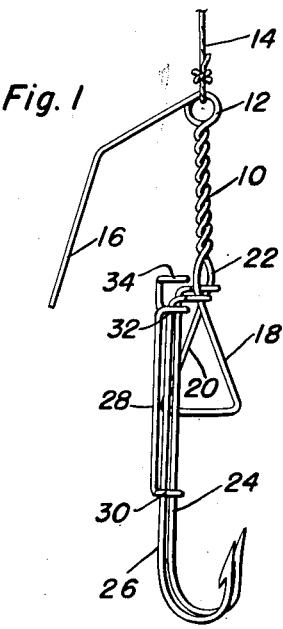
Figure 1 is an elevational side view of one form of the present invention.
Figure 3:
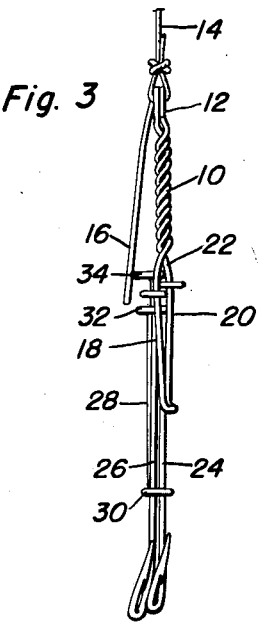
Figure 3 is a side view of the device of Figure 1.

Referring to the figures of the drawings, there is disclosed a wire 10 formed in a coil and terminating at one end in an eye or eye member 12, wherein a conventional fish line 14 is adapted to be secured. A guard 16 extends from the eye member 12 and as found desirable, one or more of these guards 16 may be employed. At the opposite end of the coil or wire 10 there is a member having converging cam sides constituting slides 18 and 20. A retaining or holding means 22 is provided in the slides 18 and 20 at the upper ends thereof for holding purposes. These slides converge toward the upper ends thereof.

The retaining device or holding means 22 is formed by arranging the slides 18 and 20 so that they cross each other at the upper ends thereof and are bent to form a small loop above the location of the crossing of said sides. The cam slides 18 and 20 are so spaced from each other at the place where they cross at their upper ends as to permit the eyes of the hooks 24 and 26 to pass freely and take their positions within the holding means 22.

The pair of hooks 24 and 26 having the eye members at the terminal portions thereof, are used in association with the cam slides 18 and 20 as well as the holding means 22. A guide 28 is provided with spaced bearings 30, 32 and 34 respectively, and the guide is arranged substantially parallel to the shanks of the fish hooks 24 and 26 respectively. The bearings 30 and 32 are slidably positioned around the shanks and the purpose of the guide with its bearings is to assure that the hooks move in unison and in the proper path of travel.

Figure 2:
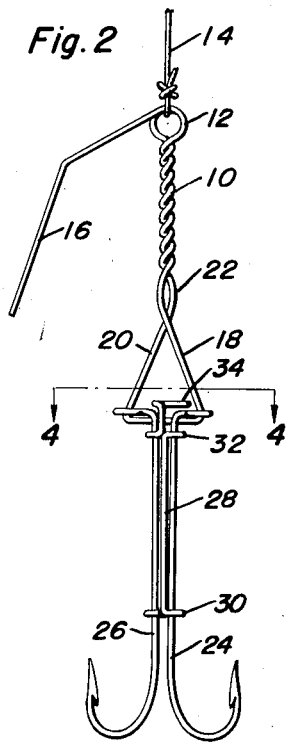
Figure 2 is an elevational view of the invention shown in Figure 1, showing a second operative position thereof.
Figure 4:
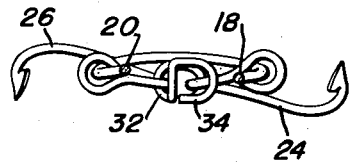
Figure 4 is a sectional view taken on the line 4—4 of Figure 2 and in the direction of the arrows.

The eye portions on the hooks are adapted to slide along the cam legs or slides 18 and 20, respectively, thereby, due to the convergence, turning the hooks to a position disclosed in Figure 1. Before the eye members of the hooks may be received in the retaining device 22, a twist of the hooks bodily is effected and the hooks are retained in this position. Upon application of a force axially of the shanks of the hooks, the hooks 24 and 26 will be rotated in opposite directions and slide down the cam slides 18 and 20 to a position shown in Figure 2. By using the described structure, a fish may be properly and effectively snared.

Having described the invention, what is claimed as new is:

1. A trap hook comprising a wire with a line fastening member at one end, a pair of fish hooks each having an eye, and a first and a second cam slide in substantially converging relation adjacent to the other end of said wire, said slides being formed from said wire, and said slides crossing each other adjacent to the said other end and being bent back above the location of said crossing and secured together to form a holding means, and said eyes of the hooks being slidably disposed on said slides and operable in said holding means wherein they are releasably retained.

2. A trap hook comprising a wire with a line fastening member at one end, a pair of fish hooks each having an eye, a first and a second cam slide in substantailly converging relation adjacent to the other end of said wire, said slides being formed from said wire, and said slides crossing each other adjacent to the said other end and being bent back above the location of said crossing and secured together to form a holding means, said eyes of the hooks being slidably disposed on said slides and operable in said holding means wherein they are releasably retained, and a guide secured to the shanks of said fish hooks connecting said fish hooks so that they rotate with respect to each other when said eyes slide on said cam slides.

3. In a trap hook, a holder having a guard and a pair of cam slides substantially converging toward the upper ends thereof where they cross each other, a pair of fish hooks with eyes slidably disposed on said cam slides, and a guide slidably disposed on said hooks, said holder having a holding means formed at the upper ends of said cam slides releasably retaining the eyes of said fish hooks therein.

4. In a trap hook, a holder having a member with two sides in substantially converging relation forming cam slides, and fish hooks having eyes slidably disposed on said slides, the upper ends of said slides crossing each other and bent back and secured together to form a holding means for releasably retaining said eyes.

5. In a trap hook, a holder having a member with two sides in substantially converging relation forming cam slides, fish hooks having eyes slidably disposed on said slides, the upper ends of said slides crossing each other and bent back and secured together to form a holding means, said eyes being releasably held in said holding means, and a guide slidably disposed on said hooks to guide said hooks.

ALBERT G. TACKETT.

REFERENCES CITED

The following references are of record in the file of this patent:

UNITED STATES PATENTS

| Number | Name | Date |
| --- | --- | --- |
| 712,497 | Coffin | Nov. 4, 1902 |
| 800,001 | Miller | Sept. 19, 1905 |
| 825,639 | Curtis | July 10, 1906 |
| 2,311,832 | Helfenstein | Feb. 23, 1943 |
| 2,498,612 | Tackett | Feb. 21, 1950 |